(12) United States Patent
Maehara et al.

(10) Patent No.: US 8,193,927 B2
(45) Date of Patent: Jun. 5, 2012

(54) SYSTEM AND METHOD FOR DETECTING WHEEL POSITION AND TIRE AIR PRESSURE

(75) Inventors: Hiroaki Maehara, Anjo (JP); Nobuya Watabe, Nagoya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 384 days.

(21) Appl. No.: 12/562,463

(22) Filed: Sep. 18, 2009

(65) Prior Publication Data

US 2010/0073157 A1 Mar. 25, 2010

(30) Foreign Application Priority Data

Sep. 19, 2008 (JP) .................................. 2008-240693

(51) Int. Cl.
*B60C 23/00* (2006.01)
(52) U.S. Cl. ................. 340/447; 340/426.33; 340/686.1
(58) Field of Classification Search .................. 340/447, 340/445, 505, 442, 438, 686, 444, 426.33, 340/686.1
See application file for complete search history.

(56) References Cited

U.S. PATENT DOCUMENTS

| | | | |
|---|---|---|---|
| 7,406,399 B2 * | 7/2008 | Furem et al. ................... | 702/182 |
| 7,508,302 B2 * | 3/2009 | Watabe .......................... | 340/447 |
| 2003/0197604 A1 * | 10/2003 | Ogawa et al. ................. | 340/445 |
| 2004/0070494 A1 * | 4/2004 | Lin et al. ........................ | 340/445 |
| 2006/0071768 A1 | 4/2006 | Iwazumi et al. | |
| 2007/0008097 A1 * | 1/2007 | Mori et al. ..................... | 340/505 |

FOREIGN PATENT DOCUMENTS

JP 2003-220809 8/2003

* cited by examiner

*Primary Examiner* — Daniel Previl
(74) *Attorney, Agent, or Firm* — Nixon & Vanderhye PC

(57) ABSTRACT

In a tire air pressure detection system, a trigger device is caused to transmit a notification trigger signal to notify wheel position detection in advance of outputting a detection trigger signal for signal magnitude measurement. After confirming reception of the notification trigger signal by a transceiver device, the trigger device is caused to transmit a detection trigger signal for wheel position detection. The detection trigger signal is transmitted after the transceiver device is set in a signal reception wait condition. The transceiver device is thus enabled to receive the detection trigger signal to measure a signal magnitude of the detection trigger signal.

8 Claims, 10 Drawing Sheets

FIG. 8

|  |  | TIMER EVENT | TRIGGER RECEPTION | | |
|---|---|---|---|---|---|
|  |  |  | DETECTION NOTIFICATION | OTHER | WHEEL DETECTION |
|  |  | A | B | C | D |
| NORMAL CONDITION<br>RECEPTION WAIT PERIOD = NORMAL (LONG)<br>POWER-ON PERIOD = NORMAL (MEASUREMENT PERIOD) | C1 | C1<br>PERIODIC MEASURE | C2 | C1 | / |
| DETECTION WAIT CONDITION<br>RECEPTION WAIT PERIOD = CONTINUOUS<br>POWER-ON PERIOD = RECEPTION WAIT | C2 | C1 | C2 | C1<br>OTHER | C1<br>MAGNITUDE MEASURE |

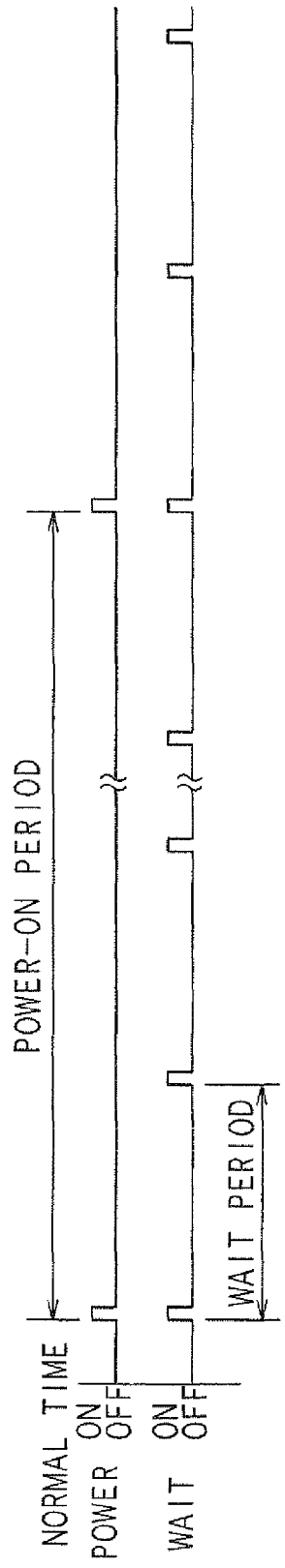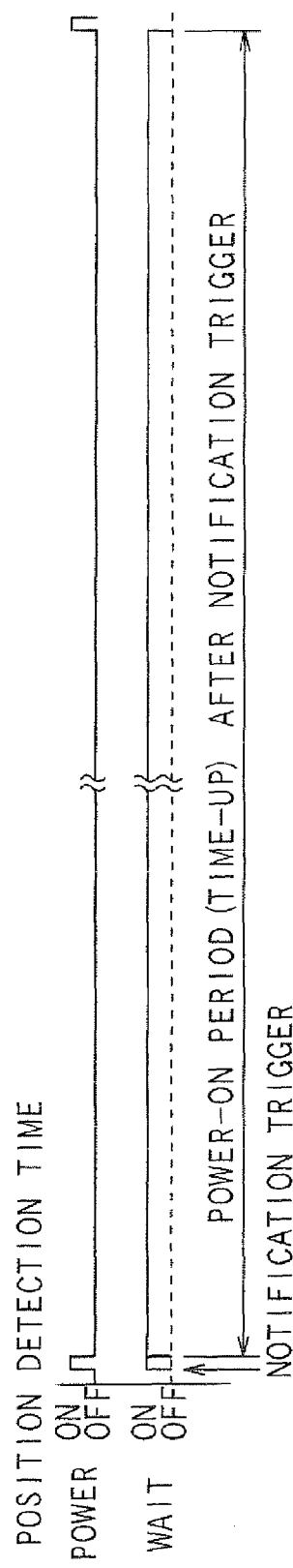

FIG. 11

| | | TIMER EVENT | TRIGGER RECEPTION | | |
|---|---|---|---|---|---|
| | | | DETECTION NOTIFICATION | OTHER | WHEEL DETECTION |
| | | A | B | C | D |
| NORMAL CONDITION RECEPTION WAIT PERIOD = NORMAL (LONG) POWER-ON PERIOD = NORMAL (MEASUREMENT PERIOD) | C1 | C1 PERIODIC MEASURE | C2 | C1 OTHER | |
| DETECTION WAIT CONDITION RECEPTION WAIT PERIOD = CONTINUOUS POWER-ON PERIOD = RECEPTION WAIT | C2 | C1 | C2 | C1 OTHER | C2 MAGNITUDE MEASURE |

SYSTEM AND METHOD FOR DETECTING WHEEL POSITION AND TIRE AIR PRESSURE

CROSS REFERENCE TO RELATED APPLICATION

This application is based on and incorporates herein by reference Japanese patent application No. 2008-240693 filed on Sep. 19, 2008.

TECHNICAL FIELD

The present invention relates to a system and method for detecting wheel position and tire air pressure of a vehicle.

BACKGROUND

In some conventional tire air pressure detection systems, a transmitter including a pressure sensor or the like is directly attached to each wheel, to which a tire of a vehicle is attached, so that the pressure sensor generates a pressure detection signal and the transmitter transmits the detection signal from a wheel. An antenna and a receiver are attached to a vehicle chassis so that the antenna receives the detection signal and the receiver detects the tire air pressure at a chassis (vehicle body).

For detecting a position of the wheel, to which the transmitter is attached, the transmitter is configured as a transceiver device having a receiver function as well as a transmitter function thereby to perform bilateral communications with the receiver of the chassis.

For example, in the following patent document 1, a trigger device attached to a chassis transmits a trigger signal so that a wheel position is determined based on attenuation of the trigger signal. Specifically, a transceiver device attached to the wheel measures a magnitude of the trigger signal and transmits data of the signal magnitude to the chassis. Thus, the position of each wheel, to which the transceiver device is attached, is detected by measuring a distance from the trigger device to the transceiver device.

In the following patent document 2, a trigger device is attached to a vehicle chassis for each of a front wheel and a rear wheel. That is, the number of the trigger devices is less than the number of wheels of a vehicle. A transceiver device attached to a wheel gradually lowers its signal reception sensitivity until it comes to fail to receive a trigger signal of the trigger device, when the trigger signal is output from the trigger device. Thus, the position of each wheel, to which the transceiver device is attached, is determined by measuring a distance from the trigger device based on until when the transceiver device receives the trigger signal.

It is thus possible to detect a position of the wheel, to which the transceiver device is attached, based on the magnitude of the trigger signal received by the transceiver device. However, the transceiver device must be held in the active state (trigger signal wait condition) to receive the trigger signal. Since the electric power of a battery provided at the wheel for the transceiver device is limited, it is not preferred to persistently maintain the receiver function of the transceiver device in the activated state. It is therefore proposed to prolong the life of the battery by periodically turning on and off the signal wait condition of the transceiver device.

Patent document 1: JP 2007-15491A (US 2007/0008097)
Patent document 2: JP 2007-17260A (US 2007/0008097)

If the signal wait condition of the transceiver device is turned on and off periodically, that is, the signal wait is performed intermittently, to prolong the battery life, the signal wait time may differ among a plurality of transceiver devices. In the case of patent document 1, therefore, if one transceiver device fails to receive the trigger signal of the trigger device, it is not possible to determine whether it is caused by the difference of the signal wait time or by a long distance from the trigger device. In the case of patent document 2, it is not possible to determine whether the failure of reception of the trigger signal is caused by the difference of the signal wait time or the lowered sensitivity of the transceiver device. As a result, the wheel position cannot be detected accurately or it takes too much time to complete the detection of the wheel position.

SUMMARY

It is therefore an object of the present invention to reduce consumption of electric power of a transceiver device attached to a wheel and enable synchronized operation between trigger signal transmission of a trigger device and a trigger signal reception of a transceiver device at time of wheel position detection.

According to one aspect of the present invention, a trigger device attached to a chassis of a vehicle transmits a detection trigger signal to a plurality of transceiver devices attached to wheels of a vehicle. The transceiver device measures a signal magnitude of the detection trigger signal when it is received in a signal wait condition of a predetermined period provided intermittently, so that a data indicating the measured signal magnitude is transmitted in return from the transceiver device. A receiver device attached to the chassis receives the data to detect a position of the transceiver device in the vehicle. In the arrangement, the trigger device transmits a notification trigger signal in advance of transmitting the detection trigger signal. The transceiver device is set in the signal wait condition to enable reception the detection trigger signal, when the notification trigger signal is received in the predetermined period. The transceiver device transmits a data indicating reception of the notification trigger signal so that the receiver device causes the trigger device to transmit the detection trigger signal.

BRIEF DESCRIPTION OF THE DRAWINGS

The above and other objects, features and advantages of the present invention will become more apparent from the following detailed description made with reference to the accompanying drawings. In the drawings:

FIG. 8 is a table showing operation conditions of the transceiver device;

FIGS. 9A and 9B are timing charts showing operations of the first embodiment at normal time and wheel position detection time, respectively;

FIG. 11 is a table showing operation conditions of the transceiver device in the second embodiment.

DETAILED DESCRIPTION OF THE PREFERRED EMBODIMENT

Figure 1:
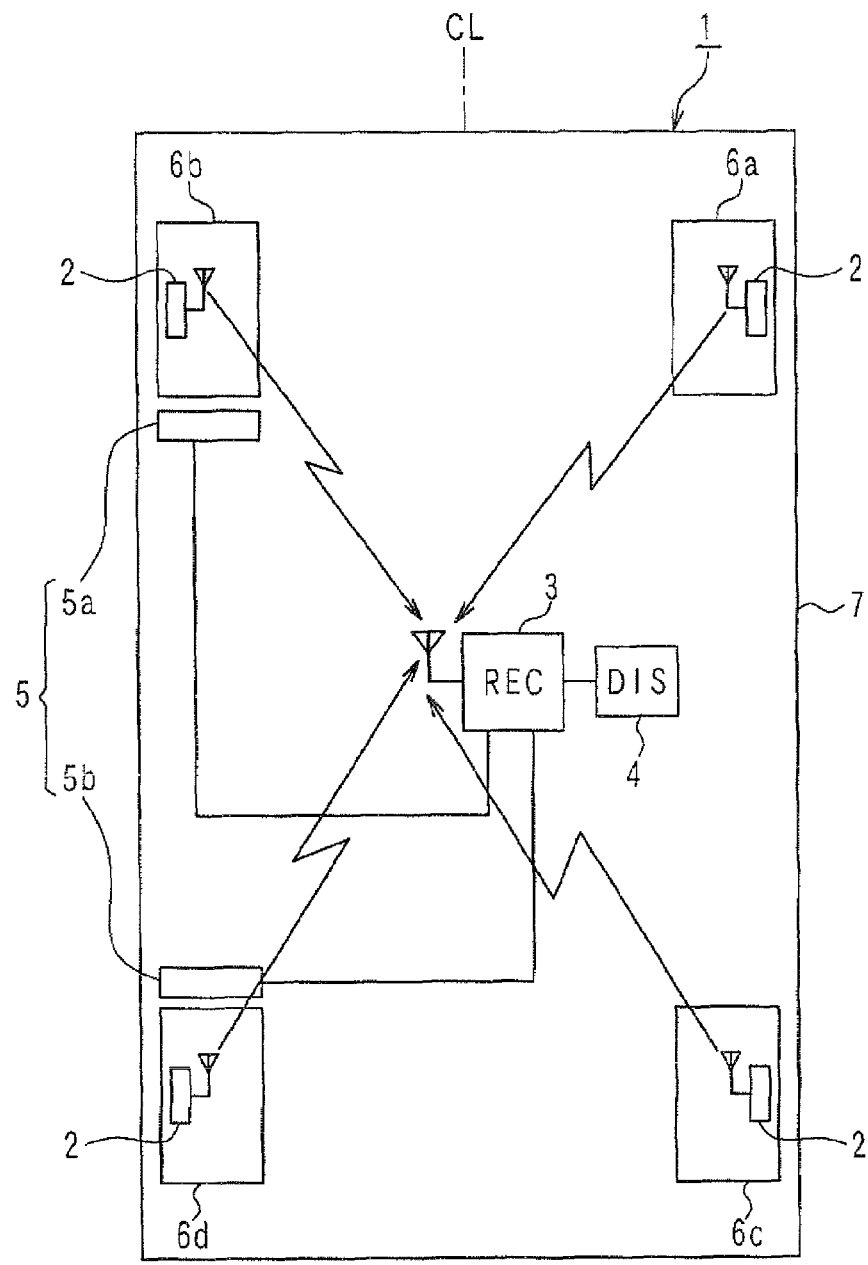
FIG. 1 is a schematic view showing a tire air pressure detection system including a wheel position detection apparatus according to a first embodiment of the present invention.

The present invention will be described in more detail with reference to embodiments, in which the same or similar parts are indicated by same reference numerals.

(First Embodiment)

Referring to FIG. 1, a vehicle 1 is shown as having a chassis (vehicle body) 7 and four tire wheels 6a to 6d.

A tire air pressure detection system is provided in the vehicle 1 and configured with four transceiver devices 2, a receiver device 3, a display 4 and two trigger devices 5a and 5b (referred to as trigger device 5). The transceiver devices 2, the receiver device 3 and the trigger devices 5 form a wheel detection apparatus.

Each transceiver device 2 is attached to the corresponding wheel 6a to 6d, which is referred to as a wheel, to detect tire air pressure of each wheel and transmits data of a detection signal indicating detected pressure. The data is included within a frame, which is transmitted. The receiver device 3 is attached to the chassis 7 to receive the frame transmitted from the transceiver device 2, so that the data included within the frame is used to detect the tire air pressure of each wheel.

Figure 2A:
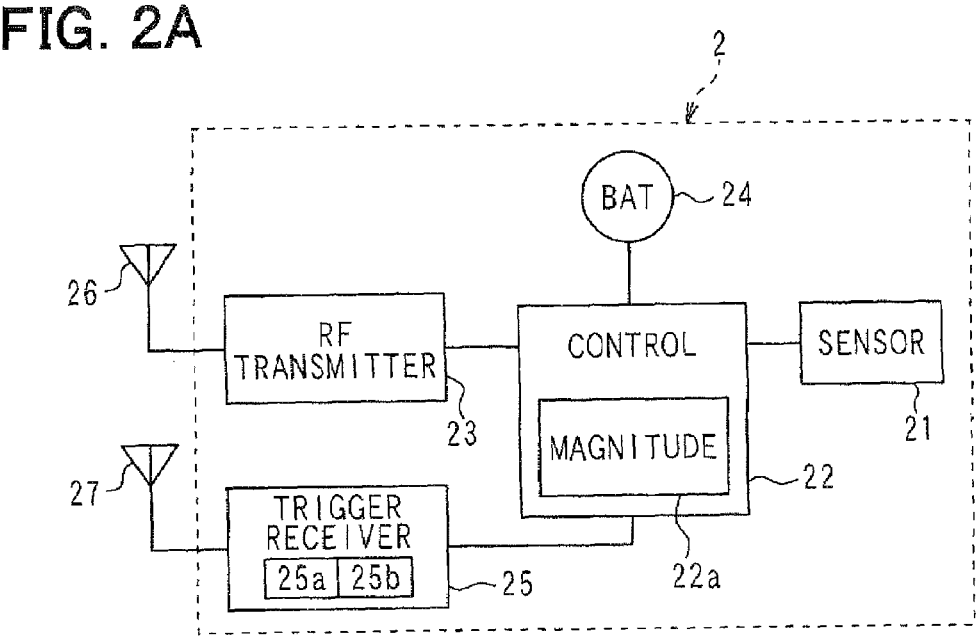
FIGS. 2A and 2B are block diagrams showing a transceiver device and a receiver device of the tire air pressure detection apparatus shown in FIG. 1, respectively.

As shown in FIG. 2A, each transceiver device 2 is configured to include a sensor 21, a first controller 22, a RF transmitter 23, a battery 24, a trigger signal receiver 25, a transmission antenna 26 and a receiver antenna 27. The trigger signal receiver 25 includes a trigger detector 25a and a data processor 25b.

The sensor 21 includes, for example, a diaphragm-type pressure sensing unit and a temperature sensing unit to output detection signals corresponding to tire air pressure and temperature.

The controller 22 is a microcomputer, which includes a CPU, a ROM, a RAM, an I/O and the like, and executes predetermined processing in accordance with programs stored in the ROM.

The controller 22 specifically receives the detection signals of the sensor 21, processes the received signals, stores data indicating the detection result (e.g., tire air pressure) within the frame together with ID information of each transceiver device 2, and sends this frame to the RF transmitter 23. The processing of sending the frame to the RF transmitter 23 is executed at a predetermined period.

The controller 22 is normally powered down, that is, not supplied with electric power from the battery 24 and not activated. It is powered on periodically or intermittently for wheel position detection and for periodic detection data transmission. At the time of the wheel position detection, a wheel position is determined when the trigger signal receiver 25 receives a trigger signal. At the time of the periodic detection data transmission (communication), the data of the detected tire air pressure is transmitted from the RF transmitter 23.

It is noted that, as described below, the trigger signal is transmitted as a notification trigger signal first for advance notification and as a detection trigger signal next for wheel position detection.

In the power-down condition, the controller 22 saves electric energy of the battery 24 by turning off the power supply to itself, the sensor 21, the RF transmitter 23 and the data processor 25b of the trigger signal receiver 25. In the power-on condition, the controller 22 turns on the power supply to itself, the sensor 21, the RF transmitter 23 and the data processor 25b of the trigger signal receiver 25 thereby to execute wheel position detection processing and tire air pressure detection processing. After completing this processing, the power supply is switched to the power-down condition again. The period of power-down condition, that is, from turning off the power supply to turning on the power supply next time is differentiated between the normal periodic communication time and the wheel position detection time, as described below.

The controller 22 includes a trigger signal magnitude measuring part 22a. When the trigger signal of the trigger device 5 is received through the antenna 27 and the trigger signal receiver 25, the controller 22 measures a signal magnitude of the trigger signal. The controller 22 processes the signal magnitude data, stores the signal magnitude data in a frame and sends the frame to the RF transmitter 23. The frame for storing the signal magnitude data may be the frame, in which the tire air pressure data has been stored, or a different frame.

The controller 22 of each wheel regulates the time point of sending the frame to the RF transmitter 23 not to overlap or butt other frames transmitted from other wheels. For example, the time point of transmission of the frame, that is, delay time, from reception of the trigger signal is differentiated among the transceiver devices 2. Thus, the frames are transmitted from the transceiver devices 2 of the wheels 6a to 6d at different time points.

If the controller 22 of each transceiver device 2 stores different transmission time points, the storage content of each transceiver device 2 becomes different. In this embodiment, therefore, the transmission time points are surely differentiated among the transceiver devices 2 in accordance with the signal magnitude. For example, the controller 22 stores a data map, which defines a relation between the signal magnitudes and the transmission time points, or stores a mathematical function, which determines the transmission time point based on the signal magnitude as a variable. With such a data map or a mathematical function, the program of the controller 22 of each transceiver device 2 need not be differentiated.

Alternatively, the program of the controller 22 may be set so that the transmission time point is changed irregularly every time. With such irregular transmission time points, it becomes possible to differentiate the transmission time points among all the transceiver devices 2 with high probability.

The RF transmitter 23 is provided as an output port to transmit the frame received from the controller 22 towards the receiver device 3 through the transmission antenna 26. The frame may be transmitted in a RF band (for example, radio wave of 315 MHz).

The trigger signal receiver 25 receives the trigger signal through the receiver antenna 27 and sends it to the controller 22, thus operating as an input port.

The trigger detector 25a is for detecting the trigger signal transmitted from the trigger device 5, and detects the trigger signal when it is set in the signal reception wait condition. The trigger detector 25a consumes a relatively small amount of electric power. However, the trigger detector 25a is set in the signal reception wait condition intermittently at a predetermined period at normal time. The period of turning on the power supply is predetermined. The trigger detector 25a is set in the signal reception wait condition persistently at wheel position detection time, that is, after the notification trigger signal is detected. The period of turning on the power supply is also predetermined.

The data processor 25b receives the trigger signal detected by the trigger signal detector 25a and processes the data, which follows synchronization information included in the trigger signal, upon receiving the synchronization information. The processed data is sent to the controller 22. The data processor 25b consumes a relatively large amount of electric power.

Therefore, the turning on and off the power supply is controlled separately from the trigger detector 25a. Specifically, only the trigger detector 25a is supplied with electric power when the trigger signal is to be received. The data processor 25b and the controller 22 are supplied with electric power when signal transmission is performed periodically or after the trigger detector 25a has received the trigger signal. Thus, electric power consumption is reduced.

The battery 24 is for supplying electric power to the sensor 21, the controller 22 and the like, so that the sensor 21 and the controller 22 are activated to detect the tire air pressure and perform various calculations using the detected tire air pressure data.

The transceiver device 2 is attached to an air inlet valve of each wheel in such a manner that the sensor 21 is exposed inside the tire. Thus, the sensor 21 and the controller 22 determine the tire air pressure and transmit the frame including the tire air pressure data through the transmitter antenna 26 at a predetermined period (for example, every 1 minute).

Figure 2B:
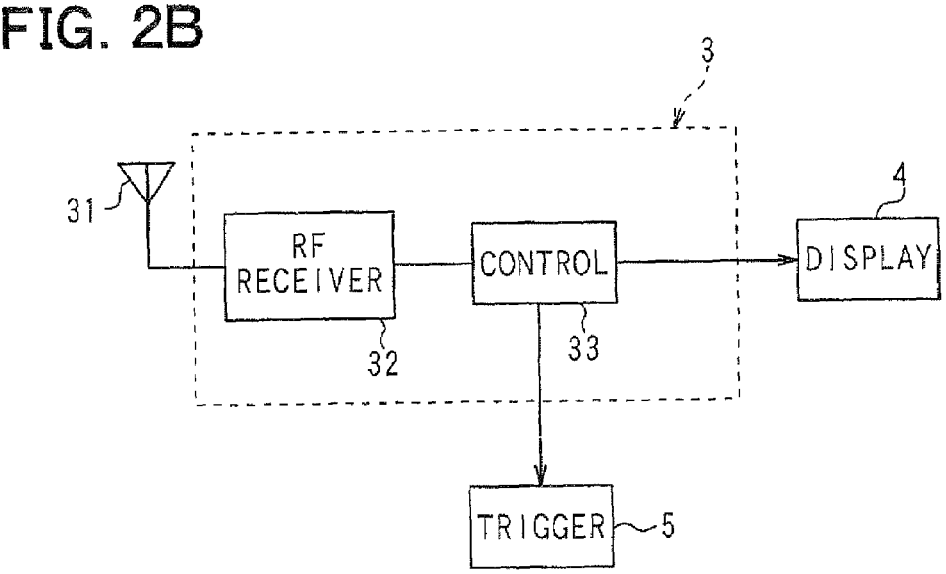

As shown in FIG. 2B, the receiver device 3 is configured to include an antenna 31, a RF receiver 32 and a second controller 33.

The antenna 31 is a single common antenna fixed to the chassis 7 and receives all the frames transmitted from the transceiver devices 2 of four wheels 6a to 6d.

The RF receiver 32 sends the frame of each transceiver device 2 received by the antenna 31 to the controller 33, thus operating as an input port.

The controller 33 is a microcomputer, which includes a CPU, a ROM, a RAM, an I/O and the like, and executes predetermined processing in accordance with programs stored in the ROM.

Specifically, the controller 33 is configured to output a trigger command signal, receive the frame which the RF receiver 32 has received, and determine the wheel position based on the received frame. The trigger command signal is for commanding the trigger device 5 to output the trigger signal. The wheel position is determined based on the signal magnitude data included in the frame. The signal magnitude data indicates the magnitude of the trigger signal received by each transceiver device 2. Thus, the wheel position is determined by specifying which one of the transceiver devices 2 of the wheels 6a to 6d has transmitted the received frame.

The controller 33 determines the tire air pressure of each wheel by way of various signal processing and mathematical calculations based on the data included in the frame and outputs an output signal corresponding to the determined tire air pressure to the display 4, For example, the controller 33 compares the determined tire air pressure with a predetermined threshold Pth with respect to each wheel and outputs to the display 4 a signal indicating decrease of tire air pressure. Thus, the controller 33 informs the display 4 of abnormality that indicates at least one tire of the wheels 6a to 6d has the decreased tire air pressure.

The display 4 is configured with an alarm light and provided in an instrument panel of the vehicle 1 to be viewed by a driver in a compartment. When the signal indicating the decreased tire air pressure is sent from the controller 33, the display informs the driver of such decrease of tire air pressure.

Each trigger device 5 (5a, 5b) is configured to output the trigger signal, when the trigger command signal is applied from the controller 33 of the receiver device 3. The trigger signal is in a LF band (for example, 125 to 135 kHz) and has a predetermined magnitude (intensity). One (first) trigger device 5a is provided at the front-side, that is, near the front wheel 6b, and the other (second) trigger device 5b is provided at the rear-side, that is, near the rear wheel 6d.

The trigger devices 5a, 5b are offset to the left-side from a central line CL. Thus, each trigger device 5a, 5b has different distances relative to the four wheels 6a to 6d. Specifically, the distance from the first trigger device 5a to the right front wheel 6b is longer than that from the first trigger device 5a to the left front wheel 6b. The distance from the second trigger device 5b to the right rear wheel 6c is longer than that from the second trigger device 5b to the left rear wheel 6d.

Further, the distances from the transceiver devices 2 of the front wheels 6a, 6b to the first trigger device 5a are shorter than the distances from the transceiver devices 2 of the front wheels 6a, 6b to the second trigger device 5b, even if the front wheels 6a, 6b rotate. The distances from the transceiver devices 2 of the rear wheels 6c, 6d to the second trigger device 5b are shorter than the distances from the transceiver devices 2 of the rear wheels 6c, 6d to the first trigger device 5a, even if the rear wheels 6c, 6d rotate.

The trigger devices 5a, 5b may be provided at any places, which are not covered fully with metal plates. They are preferably provided within a liner or a compartment, which are not covered with a metal plate and not hit by stones or the like during travel. The trigger devices 5a, 5b are preferably positioned to provide a large difference among distances between the trigger devices 5a-b and the wheels 6a to 6d.

Therefore, the trigger devices 5a-b are respectively positioned, for example, in front of the front wheel 6a, 6b or in rear of the rear wheels 6c, 6d.

Figure 3:
FIG. 3 is a diagram showing a format of a trigger signal.

The trigger signal generated by the trigger devices 5a-b include a variety of commands, so that the transceiver device 2 of each wheel 6a to 6d performs processing corresponding to such commands. Specifically, as shown in FIG. 3, the trigger signal includes synchronization information and data. When the synchronization information is received by the trigger detector 25a of the trigger signal receiver 25, the data processor 25b of the trigger signal receiver 25 and the controller 22 are turned on to perform data processing in correspondence to commands indicated by the data.

The trigger signal is received by the trigger signal receiver 25 when the trigger detector 25a is set in the signal reception wait condition. Since the period of power supply to the trigger detector 25a is set so that the trigger detector 25a may be intermittently set in the signal reception wait condition at the predetermined period in the normal time, the trigger signal is not received in other time different from the set period. As a result, the trigger signal is not received by the trigger detector 25a, unless the time point of outputting the trigger signal and the period of the power supply to the trigger detector 25a are synchronized.

Figure 4A:
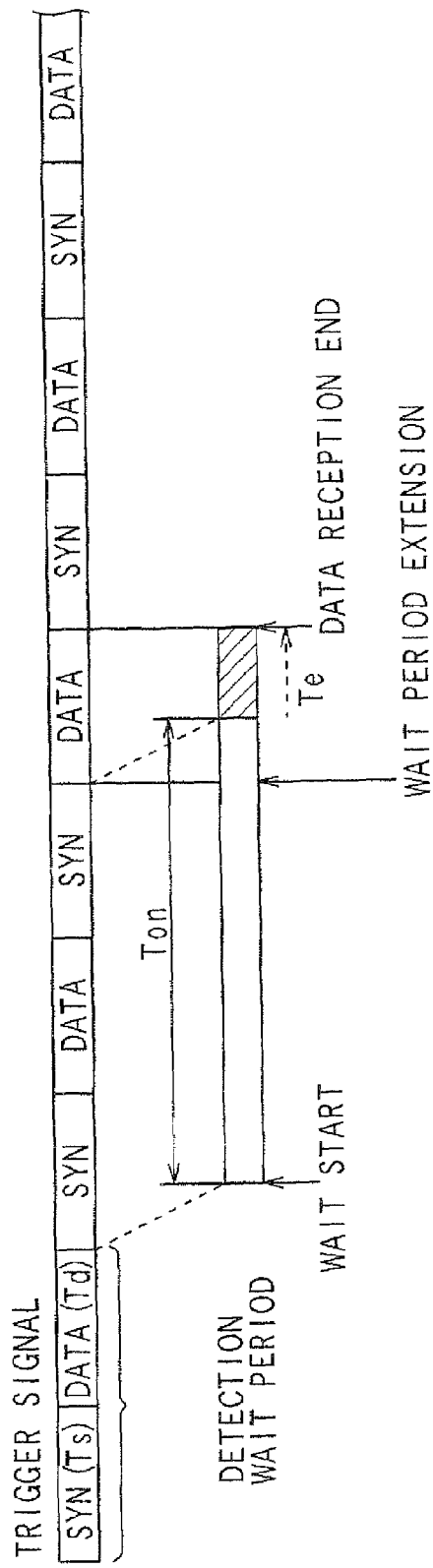
FIGS. 4A and 4B are timing charts showing a relation between a trigger signal wait condition period and a trigger signal length and a relation between a trigger signal transmission period and a trigger signal wait condition period, respectively.
Figure 4B:
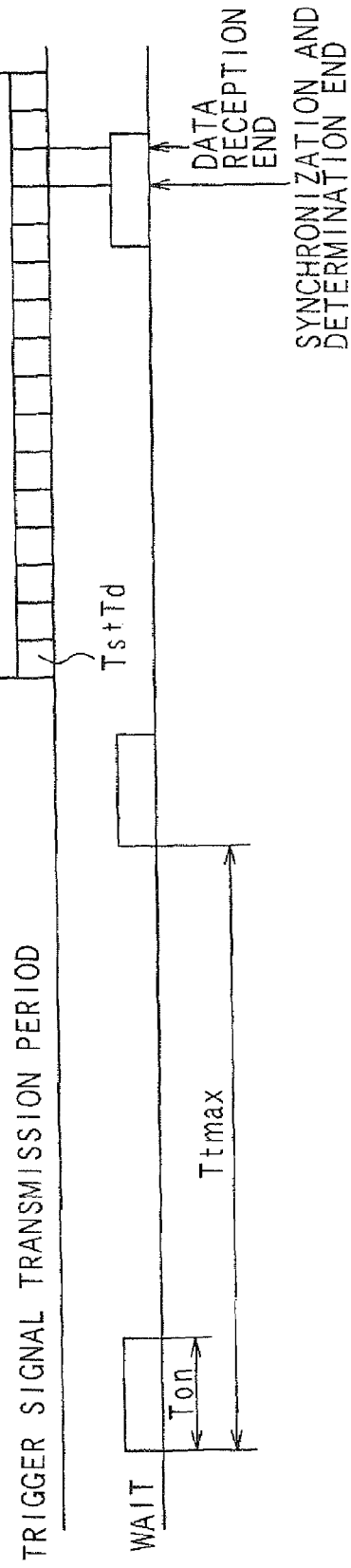

For surely receiving the trigger signal by the trigger detector 25a of the trigger receiver 25, the period of transmitting the trigger signal (notification trigger signal) from the trigger device 5 and the period of the signal reception wait condition of the trigger detector 25a are determined to satisfy the relation shown in FIGS. 4A and 4B. FIG. 4A shows a relation between the period of the trigger signal reception wait condition of the trigger detector 25a and the length of the trigger signal. FIG. 4B shows a relation between the period of transmission of the trigger signal and the period of the trigger signal reception wait condition of the trigger detector 25a.

As shown in FIG. 4A, when the trigger signal is outputted, one frame of trigger signal, which includes one set of synchronization information and data, is outputted a plurality of times so that each frame forming one period is repeated over a plurality of periods. The period Ton of the signal reception wait period of the trigger detector 25a is set to be longer than a period (Ts+Td+Ts), which is a sum of a period of one frame (set of synchronization information and data: Ts+Td) and a period (Ts) of one more synchronization information.

When the trigger detector 25a receives the synchronization information, it detects transmission of the trigger signal by being triggered by the synchronization information and receives the data following the synchronization information. As long as the period Ton of the signal reception wait condition is set to be longer than two periods (2×Ts) of the synchronization information and the period of data (Td), the period (Ts) of outputting the synchronization information and the period (Ton) of the signal reception wait condition overlap at least once. Thus, the trigger detector 25a can surely receive the synchronization information within its wait condition period Ton.

When the trigger detector 25a detects the synchronization information, it further checks whether the synchronization information is for causing the transceiver device 2 to perform a command, that is, whether the synchronization information is directed to the transceiver device 2. For example, the trigger detector 25a of the trigger receiver 25 for the wheel 6a checks whether the synchronization information is directed to the transceiver device 2 of the wheel 6a. If the trigger detector 25a determines that the synchronization information is directed to the transceiver device 2, the trigger detector 25a turns on the power supply to the data processor 25b of the trigger receiver 25 and the controller 22 and extends the period of the signal reception wait condition by a period Te until the end of reception of the data following the synchronization information. Thus, the trigger detector 25a ensures the reception of the data included in the trigger signal. If the trigger detector 25a determines that the synchronization information is not directed to the transceiver device 2, the power supply to the data processor 25b of the trigger receiver 25 and the controller 22 is not turned on. As a result, power consumption is reduced.

Assuming that a maximum period (interval) between two reception wait periods Ton is set to Ttmax as shown in FIG. 4B, a period Tt of repetition of transmission of the frame of the trigger signal (set of synchronization information and data) is set equal to or longer than the maximum period Ttmax. With this arrangement, during the period Tt of repetition of transmission of the trigger signal, the trigger detector 25a of the trigger receiver 25 is surely set in the signal reception wait condition (period Ton) at least once. Thus, the trigger detector 25a is enabled to detect the trigger signal without fail.

The operation of the tire air pressure detection system is described in more detail with reference to flowcharts shown in FIGS. 5 to 7. In the description to follow, the processing executed by the receiver device 3 at the chassis-side and the processing executed by the transceiver device 2 at the wheel side are separated.

Figure 5:
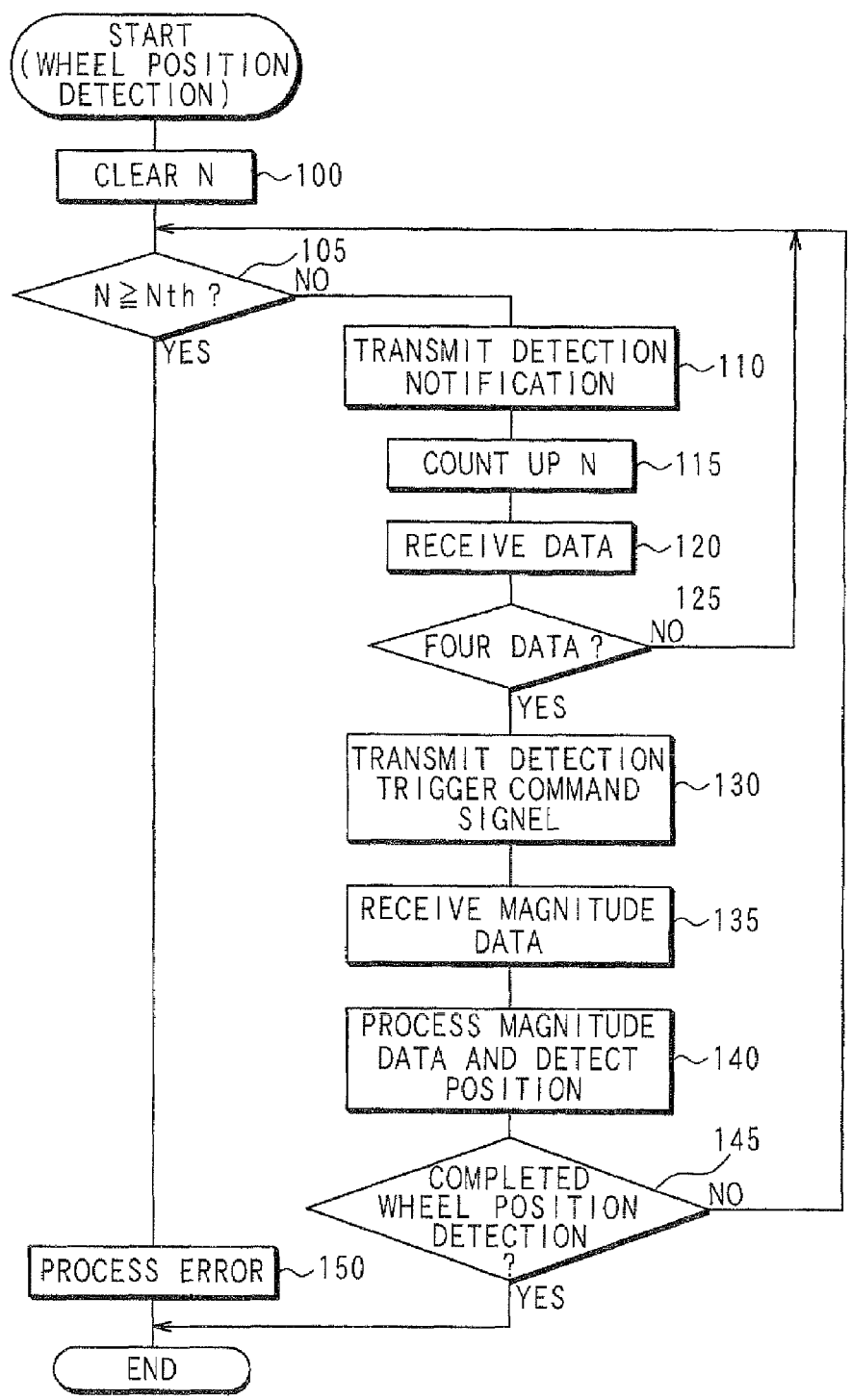
FIG. 5 is a flowchart showing wheel position detection processing executed by a controller of the receiver device.
Figure 6:
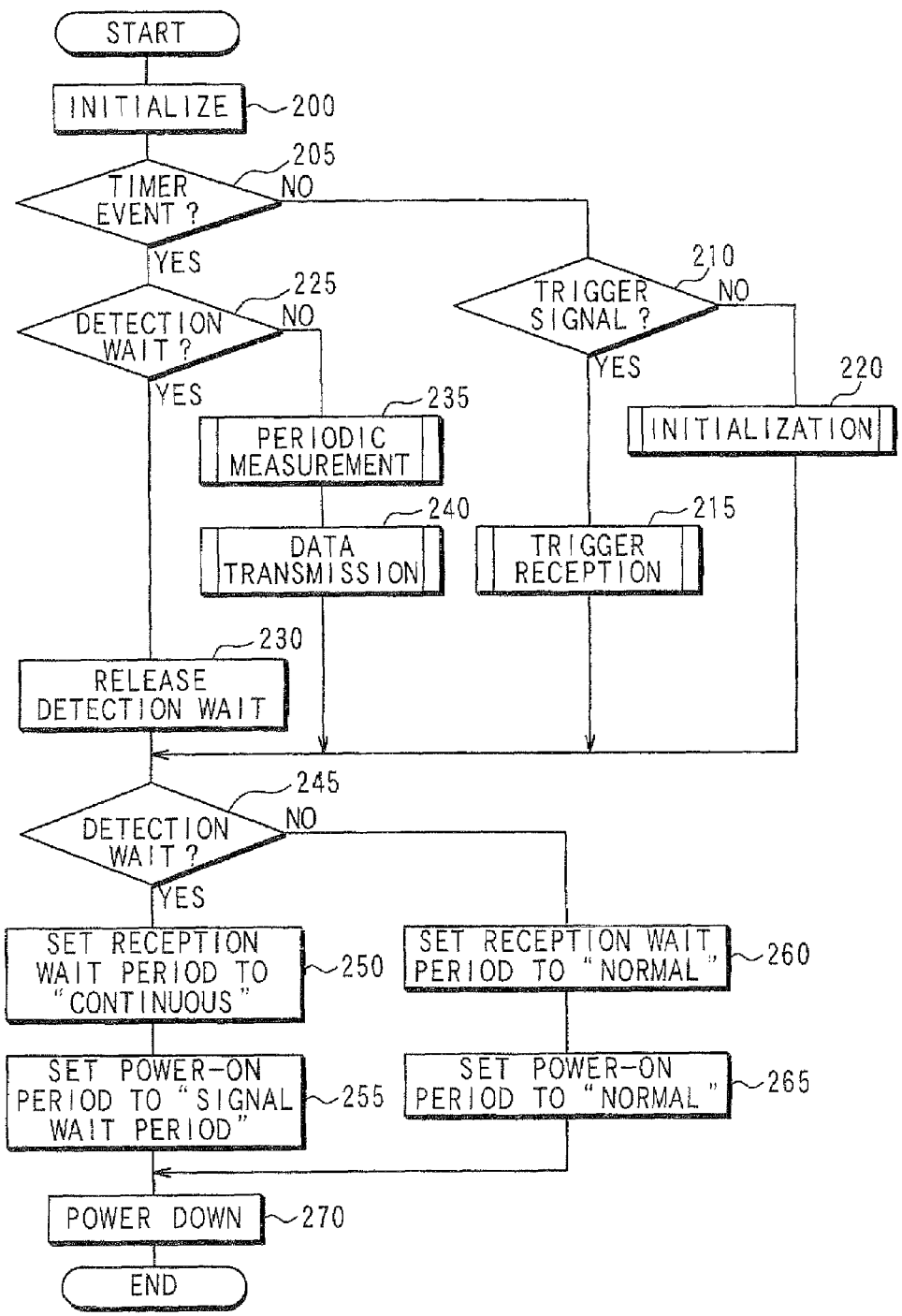
FIG. 6 is a flowchart showing processing executed by a controller of the transceiver device.

The wheel position detection processing is shown in FIG. 5. This processing is executed by the receiver device 3, particularly by the controller 33, when a predetermined time elapses after an ignition switch (not shown) of the vehicle 1 is turned on and the power supply to the controller 33 is turned on. The controller 33 executes an initial check operation before the predetermined time elapses.

First at step 100, a notification count N is cleared by resetting the count N to zero as initial processing. The notification count N is the number of times of transmission of wheel position detection notification, which is transmitted as the notification trigger signal toward the transceiver device 2 of each wheel 6a to 6d at step 110.

It is checked at step 105 whether the notification count N is equal to or greater than a predetermined threshold count Nth. If the check result is NO, step 110 is executed.

At step 110, the detection notification is transmitted to the transceiver device 2 of each wheel 6a to 6d. Specifically, a notification trigger command signal is outputted to the first and second trigger devices 5a and 5b so that each of the first and second trigger devices 5a and 5b outputs the notification trigger signal for performing one detection notification. The detection notification is a notice to the transceiver device 2, indicating that the wheel position detection will be started from now. When the notification trigger signal is received by the transceiver device 2, the transceiver device 2 is set to the signal reception wait condition for measuring the signal magnitude of the detection trigger signal, which will be transmitted following the notification trigger signal. The notification trigger signals of the first and second trigger devices 5a and 5b may be outputted at the different time or at the same time.

The notification count N is counted up at step 115, and data of the transceiver device 2 is received at step 120. This data is transmitted in return from the transceiver device 2, as described below with reference to step 315 in FIG. 7, when the transceiver 2 receives the notification trigger signal of the trigger device 5a, 5b. This data may be a data indicating that a command included in the notification trigger signal has been executed.

It is checked at step 125 whether all the data of the four wheels, that is, all the data of the four transceiver devices 2, have been received in response to the notification trigger signal. If the check result is YES, a detection trigger command signal is outputted to each trigger device 5a, 5b at step 130 so that each trigger device 5a, 5b outputs the detection trigger signal for wheel position detection. This signal for wheel position detection is for the transceiver device 2 to measure the signal magnitude, which varies with distance between the trigger device 5a, 5b and the transceiver 2. The detection trigger signal for wheel position detection may include, following synchronization information, data represented in a non-modulated continuous wave. The signal magnitude of this non-modulated continuous wave is measured by the trigger signal magnitude measuring part 22a of the controller 22, when the data processor 25b of the trigger receiver 25 and the controller 22 are powered on in response to the synchronization information.

At step 135, a frame including signal magnitude data transmitted from the transceiver device 2 in response to the detection trigger signal is received. As described below with reference to step 315 in FIG. 7, when the signal magnitude of the detection trigger signal is measured by the transceiver device 2, the transceiver device 2 transmits the frame including its ID information and the signal magnitude data indicating the measured magnitude of the detection trigger signal. The signal magnitude data is processed at S140 to determine a particular one of the wheels 6a to 6d, that is, the transceiver devices 2, which has transmitted the frame including the signal magnitude data.

For example, if two frames are received by transmitting the detection trigger signal for wheel position detection from the first trigger device 5a, the signal magnitude data included in the two frames are compared. The greater one of the two signal magnitude data is determined to be from the transceiver device 2 of the left front wheel 6b, and the smaller one is determined to be from the transceiver device 2 of the right front wheel 6a. The ID information of the determined transceiver device 2 is stored. Similarly, if two frames are received by transmitting the detection trigger signal for wheel position detection from the second trigger device 5b, the signal magnitude data included in the two frames are compared. The greater one of the two signal magnitude data is determined to be from the transceiver device 2 of the left rear wheel 6d, and the smaller one is determined to be from the transceiver device 2 of the right rear wheel 6d. The ID information of the determined transceiver device 2 is stored. Thus, the ID information of each transceiver device 2 is stored in the controller 33 of the receiver device 3 in such a manner that the correspondence between the transceiver device 2 and the wheel 6a to 6d is specified.

It is checked at step 145 whether the wheel position detection has been completed. This check may be executed by, for example, checking whether the ID information of each transceiver device 2 has been stored with respect to all four wheels. If this check result is YES, the wheel position detection processing is completed.

If the check result at step 125 or 145 is NO, step 105 and subsequent steps are repeated as described above until the notification count N reaches the threshold count Nth, so that all the transceiver devices 2 of the four wheels 6a to 6d are set to the signal reception wait condition. If the check result at steps 125 or 145 continues to be NO when the notification count N reaches the threshold count Nth, communication error processing is executed at step 150. The communication error may be indicated on the display 4 so that necessary processing may be taken to counter the communication error.

The processing of each transceiver device 2 is described next with reference to a flowchart shown in FIG. 6.

Each transceiver device 2 executes processing related to the wheel position detection in response to the trigger signals transmitted from the trigger device 5. The trigger signals are transmitted based on the wheel position detection processing executed by the receiver device 3 as shown in FIG. 5. The transceiver device 2 also executes processing relating to periodic transmission for periodically performing the tire air pressure detection.

The transceiver device 2, particularly the controller 22, executes required processing by determining which one of the wheel position detection or the tire air pressure detection should be performed. The wheel position detection is executed in accordance with various commands included in the trigger signal transmitted from the trigger device 5 in response to command from the receiver 3. The tire air pressure detection is executed periodically in the periodic transmission mode.

First at step 200, various states are initialized. For example, flags are reset. It is then checked at step 205, whether the power-on is caused by a timer as a timer event or by other sources.

The timer event is caused at every predetermined period or interval. For example, it is caused when the tire air pressure is to be periodically detected in the periodic transmission mode or when the wheel position detection wait condition is to be released due to failure of the wheel position detection. It is determined to be a timer event by checking whether the power-on is timed with a power-on period, which is set at step 255 or 265 as described below.

If the notification trigger signal of the trigger device 5 is received, the controller 22 is powered on even if it is not a timer event. For example, if the wheel position detection processing is executed by the receiver 3 and the notification trigger signal for notification of the wheel position detection is transmitted at step 110 as described above, the controller 22 is powered on upon reception of the notification trigger signal. If it is the timer event (YES), step 225 is executed. If it is not the timer event (NO), step 210 is executed.

At step 210, it is checked whether the trigger signal has been received, that is, whether the power-on is caused by the trigger signal. If the power-on is caused by the notification trigger signal, it is not abnormal and processing indicated by the command of the notification trigger signal should be executed. If the power-on is not caused by the trigger signal, some abnormality is assumed. Such abnormality may include uncontrollable program execution in the controller 22 or turn-on of power supply due to reset operation at the time of drop of power of the battery 24. Therefore, if the check result at step 210 is YES and NO, trigger reception processing of step 215 and initialization processing of step 220 are executed, respectively.

Figure 7:
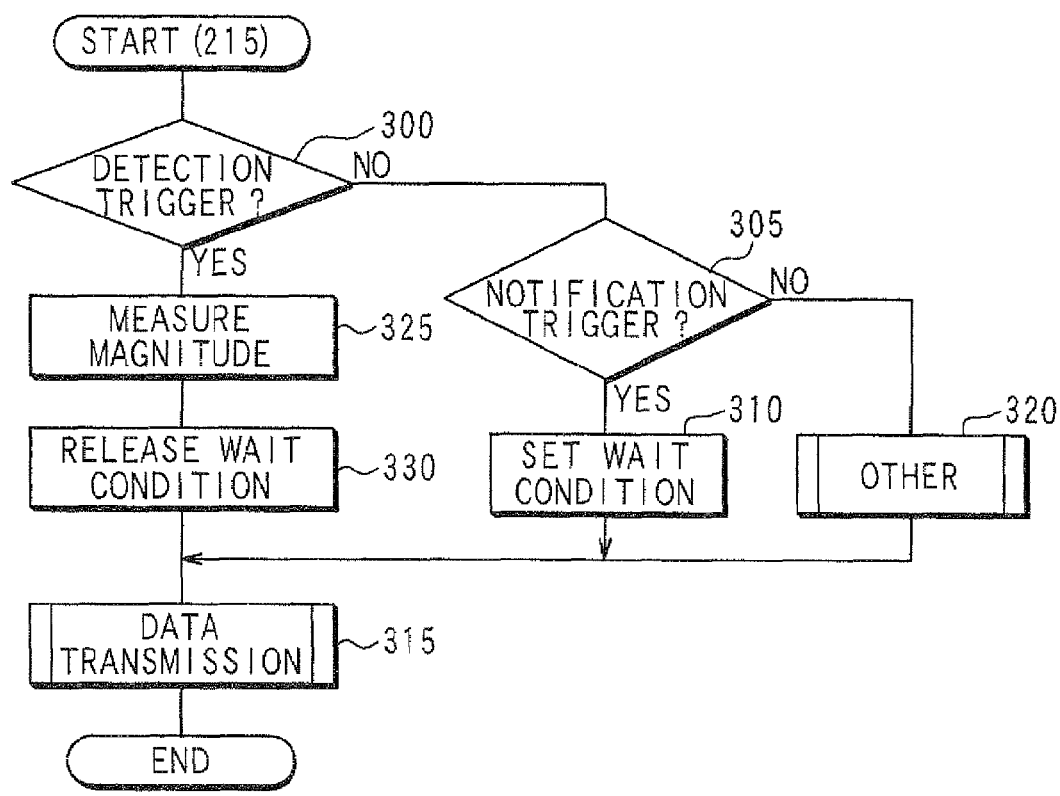
FIG. 7 is a flowchart showing details of trigger signal reception processing.

The trigger reception processing of step 215 is shown in detail in FIG. 7. In this processing, at step 300, it is checked whether the trigger signal is the detection trigger signal for detecting the wheel position. The check result is NO, if the receiver device 3 just executed step 110, that is, if the notification trigger signal has been transmitted but the detection trigger command signal of step 130 is not transmitted yet. In this case (NO), step 305 is executed.

At step 305, it is checked whether the trigger signal is the notification trigger signal. If the check result is YES, the trigger detector 25a of the trigger signal receiver 25 is set in the signal reception wait condition for the wheel position detection (wheel position detection wait condition) at step 310. Then, at step 315, a frame, which includes the ID information of itself (transceiver device 2) and data indicating that the wheel detection wait condition, is set. If the check result at step 305 is NO, for example, the trigger signal indicates a command irrelevant to the wheel position detection, step 320 is executed to execute other processing indicated by such a command different from the wheel position detection. Then, at step 315, a frame including the ID information of the transceiver device 2 and data indicating the other command processing is transmitted.

If the check result at step 300 is YES indicating that the trigger signal is the detection trigger signal, step 325 is executed so that the trigger signal magnitude measurement part 22a measures the signal magnitude of the detection trigger signal. Since the detection trigger signal is the non-modulated continuous wave, the signal magnitude of this continuous wave is measured. Then, at step 330, the trigger detector 25a of the trigger signal receiver 25 is released from the wheel position detection wait condition. The frame including data indicating the measured signal magnitude and the ID information of the transceiver device 2 is transmitted at step 315. This frame including the magnitude data of the detection trigger signal and the ID information of the transceiver device 2 is received by the receiver device 3 in the data reception processing at step 135 (FIG. 5) so that the position of the wheel, specifically the corresponding transceiver device 2, which transmitted the frame, is detected.

If the check result at step 205 (FIG. 6) is YES, that is, the power-on is caused as the timer event, step 225 is executed.

At step 225, it is checked whether it is in the wheel position detection wait condition. This check result becomes YES and NO, if the wheel position detection wait condition has been set and not set at step 310 (FIG. 7), respectively. That is, the power-on is caused by the timer event, when the tire air pressure detection is performed periodically in the periodic transmission mode or the wait condition is released due to failure of the wheel position detection.

The check result of YES indicates that the power is turned on as the timer event although the wheel position detection wait condition is set. If the wheel position detection wait condition is set, the detection trigger signal indicating the wheel position detection is received by each transceiver device 2 normally before the power is turned on as the timer event. For this reason, check result of step 205 becomes NO and hence step 225 will not be executed. As a result, if the detection trigger signal is not received by the transceiver device 2, an abnormal condition is assumed to be present and the wheel position detection is finished. Specifically, if the check result at step 225 is YES, the wheel position detection wait condition is released at step 230 thereby to terminate the wheel position detection.

If the check result at step 225 is NO, that is, the power is turned on as the timer event for periodically perform the tire air pressure detection, step 235 is executed to perform periodic tire air pressure measurement processing. In this processing, the sensor 21 is powered on, and a detection signal of the sensor 21 varying with the tire air pressure or the tire inside temperature is processed or modified so that data of the tire air pressure is produced. This data relating to the tire air pressure is included in the frame together with the ID information of the transceiver device 2. This frame produced at step 235 is transmitted as a part of data transmission processing at step 240, so that the receiver device 3 detects the tire air pressure of each wheel 6a to 6d as described below.

Following steps 215, 220, 230 and 240, it is checked at step 245 whether it is in the wheel position detection wait condition as in step 225. This check result becomes YES, only when the wheel position detection wait condition has been set at step 310 (FIG. 7). That is, this check result becomes YES, when the receiver device 3 notifies each transceiver device 2 of execution of wheel position detection, that is, when the trigger device 5 transmits the notification trigger signal. When the transceiver device 2 receives the notification trigger signal, the controller 22 is powered on.

If the check result at step 245 is YES, a reception wait period is set to "continuous" at step 250, and a power-on period is set to "detection trigger signal wait period" at step 255. If the check result at step 245 is NO, the reception wait period is set to "normal" at step 260, and the power-on period is set to "normal," which is different from a detection trigger reception wait period.

The reception wait period is a period, during which the trigger detector 25a is set in the signal reception wait condition. Since the reception wait period is set to "continuous" if the wheel position detection wait condition is set, the signal reception wait condition is maintained persistently. In the normal condition, in which the tire air pressure detection is performed periodically in the periodic transmission mode, the reception wait period is set to "normal." This period is set long so that the trigger detector 25a is set in the signal reception wait condition intermittently. In the normal condition, the power consumption of the trigger detector 25a is relatively small. To reduce this power consumption more, the period of turning on the power supply is set so that the signal reception wait condition is provided intermittently for a short period. In the wheel position detection time, the period of turning on the power supply is set to a long period to perform the wheel position detection.

The power-on period is a period for automatically powering on the controller of the transceiver device 2 as the timer event next time. For example, the power-on period is set to be longer in the case of waiting for the detection trigger signal than in the normal case of periodically detecting the tire air pressure in the periodic transmission mode.

After the reception wait period and the power-on period are set, power supply to the controller 22 is turned off at step 270. The controller 22 turns off the power supply to itself as well as the sensor 21 and the RF transmitter 23, and further turns off the power supply to the data processor 25b of the trigger signal detector 25. As a result, the power consumption in the transceiver device 2 is reduced.

As described above, various processing including the wheel position detection processing executed by the receiver device 3 and the related processing executed by the transceiver device 2 are performed. The receiver device 3 performs the ID registration processing. After this registration processing is completed, the reception condition of the receiver device 3 is switched over to receive only the registered IDs and the tire air pressure is detected in correspondence to the registered IDs.

Specifically, since the receiver device 3 does not command the trigger device 5 to transmit the trigger signal for the wheel position detection, the reception wait period and the power-on period of the transceiver device 2 are set to "normal." As a result, the transceiver device 2 operates in the periodic transmission mode so that it periodically measures the tire air pressure and transmits the data of the tire air pressure. The controller 22 periodically turns on the power supply to itself, the sensor 21, the RF transmitter 23 and the data processor 25b of the trigger signal receiver 25. The controller 22 receives the detection signals of the tire air pressure and the tire inside temperature from the sensor 21, processes the detection signal to produce the data relating the tire air pressure, and stores the data in the frame along with the ID information of each transceiver device 2. Thus, the frame is transmitted through the RF transmitter 23 to the receiver device 3.

When the frame is transmitted from the transceiver device 2, it is received by the antenna 31 and inputted to the controller 33 through the receiver 32. The controller 33 extracts, from the received frame, data indicating the tire air pressure and the tire inside temperature, and corrects the tire air pressure by the tire inside temperature to finally determine the tire air pressure. The controller 33 compares the ID information included in the frame with the ID information registered at the time of ID registration thereby to check whether the data belongs to the subject vehicle or to other vehicles. The controller 33 performs the tire air pressure detection only when it is confirmed by the ID comparison result that the data belongs to the subject vehicle.

If a difference between the tire air pressures detected this time and the previous time is less than a predetermined threshold difference, the period or interval of detecting the tire air pressure is maintained at, for example, 1 minute. If the difference is more than the predetermined threshold difference, the period is shortened to, for example, 5 seconds.

If the tire air pressure detected as above falls below a predetermined threshold pressure, the controller 33 causes the display to indicate fall of tire air pressure so that a driver may recognize that the fall of tire air pressure at either one of the wheels 6a to 6d.

As described above, the transceiver device 2 is set to various operation conditions as summarized in a table form in FIG. 8.

In this table, the normal condition for periodically detecting the tire air pressure in the periodic transmission mode is identified as C1, and the wheel position detection wait condition is identified as C2. In each of the conditions C1 and C2, the following conditions are set with respect to the cases of the generation of timer event, the reception of notification trigger signal and the reception of detection trigger signal.

In the normal condition C1, the reception wait period is set to "normal (long period)," and the power-on period is set to "normal (short period)." If the timer event arises and the controller 22 and the like are powered on in this condition, the same condition C1 is maintained. If the trigger signal, particularly the notification trigger signal, is received, the condition is changed to the condition 2 thereby to wait for the detection trigger signal. If the trigger signal is a different command other than the notification trigger signal, the normal condition C1 is maintained and such a different command is executed. In the normal condition, the detection trigger signal, which will be transmitted in the signal reception wait condition, will not be received, no change of condition is considered.

In the wheel position detection wait condition C2, the reception wait period is set to "continuous" so that the wait condition is maintained persistently, and the power-on period is set to "detection trigger signal reception wait" If the timer event arises and the controller 22 and the like are powered on in this condition, priority is given to the timer event. As a result, the condition is changed to the normal condition C1. However, if the trigger signal, particularly the notification trigger signal, is received, the condition 2 is maintained. If the trigger signal is a different command other than the notification trigger signal, the detection condition is changed to the normal condition C1 and such a different command is executed. If the trigger signal, particularly the detection trigger signal, is received, the signal magnitude of the detection trigger signal is measured and the measured data is included in the frame with the ID information and transmitted. After that, the condition is changed to the normal condition C1, thereby finishing the wheel position detection.

A part of operation of the transceiver device 2 is shown in FIGS. 9A and 9B, with respect to the normal time (FIG. 9A) and the position detection time (FIG. 9B).

In the normal time, as shown in FIG. 9A, the reception wait period of the trigger detector 25a is set to "normal (long)." To reduce the power consumption, the power supply to the trigger detector 25a is turned on for a short period intermittently. The timer event for the periodic transmission arises at every power-on period set at the time of periodic transmission, so that the controller 22, the data processor 25b and the like are powered on. The sensor 21 is also powered on to perform periodic measurement of the tire air pressure and the tire inside temperature.

In the wheel position detection time, as shown in FIG. 9B, the notification trigger is outputted in response to the trigger command signal of the receiver device 3. When the trigger detector 25a is turned on for the predetermined period, the notification trigger signal is received by the trigger detector 25a. With this reception of the notification trigger signal, the reception wait period is set to "continuous" and the power-on period is set to the detection trigger signal reception wait. As a result, the signal reception wait condition of the trigger detector 25a is maintained persistently during the reception wait period. After the controller 22 and the data processor 25b are powered on once, the power supply is continued until the trigger detector 25a detects a new trigger signal during the power-on period or the power-on period reaches a predetermined period (time-up).

If the trigger detector 25a receives no trigger signal until the power-on period elapses, the controller 22 and the data processor 25b are powered off at the expiration of the power-on period so that the wait condition of the trigger detector 25a is reset. If the trigger detector 25a receives the detection trigger signal within the power-on period, the command indicated by the data of the detection trigger signal is executed. In this case, if the detection trigger signal is received, it is possible to execute various processing required to detect the wheel position such as signal magnitude measurement in accordance with the trigger signal.

According to the tire air pressure detection system including the wheel position detection apparatus, the trigger detector 25a for detecting the trigger signal is set in the signal reception wait condition intermittently. Further, the controller 22, sensor 21, the RF transmitter 23 and the data processor 25a of the trigger signal receiver 25 are also powered on intermittently. The trigger signal formed of a repetition of frames is transmitted for a period longer than the reception wait period of the trigger detector 25a. Thus, the synchronization information included in the frame of the trigger signal can be received surely by the trigger detector 25a. If the trigger detector 25a receives the synchronization information in the signal reception wait condition, the signal reception wait condition is maintained until all the data following the synchronization information is received. Thus, the data included in the trigger signal can be received by the trigger detector 25a surely.

For this reason, not only the controller 22 and the like, which consume more power, are operated intermittently, but also the trigger detector 25a, which consumes only a small amount of power, is operated intermittently. Further, the trigger signal can be received surely even if the trigger detector is operated only intermittently.

When the trigger detector 25a receives the synchronization information included in the trigger signal, it is checked whether the synchronization information is for causing the transceiver device 2 to execute the command, that is, whether it is directed to the transceiver device 2. Therefore, unless the trigger detector 25a determines that the synchronization information is directed to the transceiver device 2, the data processor 25b, the controller 22 and the like are prohibited from being powered on. This further reduces the power consumption.

Before the detection trigger signal is transmitted for signal magnitude measurement for the wheel position detection, the notification trigger signal is transmitted. Only after confirming that the notification trigger signal has been received by the transceiver device 2, the receiver 3 causes the trigger device 5 to transmit the detection trigger signal. As a result, the detection trigger signal is transmitted for the wheel position detection after the transceiver device 2 is set in the signal reception wait condition. The signal magnitude can thus be measured surely.

The controller 22 and the transmitter 23 are intermittently powered on with the periodic supply of power while operating the trigger detector 25a intermittently. As a result, in reducing the consumption of power of the battery 24 in the transceiver device 2 attached to the wheel, the transmission of the trigger signal from the trigger device 5 and the reception of the trigger signal at the transceiver device 2 can be synchronized at the time of the wheel position detection. Thus, the detection trigger signal can be received surely by the transceiver device 2.

If no detection trigger signal is received by the trigger detector 25a after setting the trigger detector 25a in the signal reception wait condition, the signal reception wait condition is released and the trigger detector 25a is powered down after a predetermined time. If the detection trigger signal is received by the trigger detector 25a, however, the signal reception wait condition is released and the trigger detector 25a is powered down after measuring the signal magnitude of the detection trigger signal. Thus, the trigger detector 25a need not be maintained in the reception wait condition unnecessarily long and the power consumption can be reduced.

(Second Embodiment)

Figure 10:
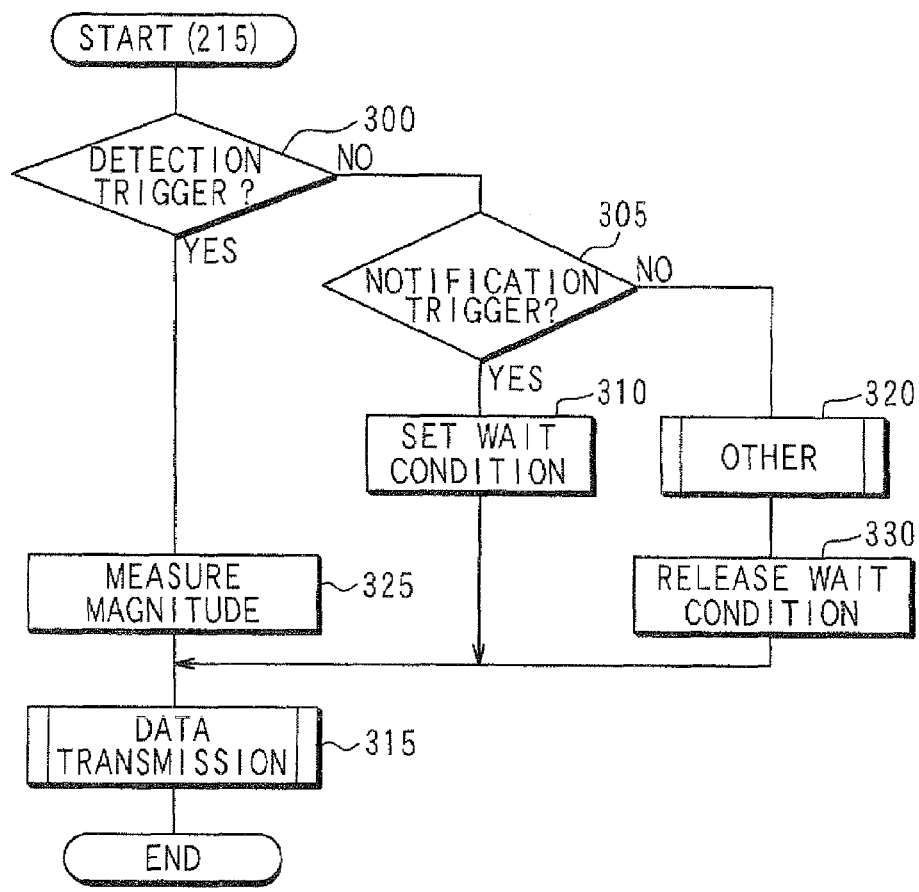
FIG. 10 is a flowchart showing details of trigger reception processing executed in a second embodiment of the present invention.

In the second embodiment, the trigger reception processing is modified as shown in FIGS. 10 and 11 from the first embodiment. Specifically, although the signal reception wait condition is released at step 330 following the signal magnitude measurement at step 325 in the first embodiment as shown in FIG. 7, the signal reception wait condition is released at 330 following the other command processing at S320 in the second embodiment as shown in FIG. 10. Thus, it is possible to release the trigger detector 25a from the signal reception wait condition after receiving other trigger signal and executing the command of the other trigger signal.

The operation conditions of the transceiver device 2 in the second embodiment are summarized in a table form as shown in FIG. 11. As understood from comparison with the table shown in FIG. 8, the operation conditions of the transceiver device 2 in the second embodiment are differentiated from that in the first embodiment in that, even if the detection trigger signal is received in the wheel position detection wait condition, the condition 2 is not changed to the condition 1 but maintained in the condition 2.

(Modifications)

The above embodiments may be modified in many aspects.

For example, the antenna 31 of the receiver device 3 need not be the single common antenna but may be provided separately for each of the transceiver devices 2 of the wheels 6a to 6d. The present invention is particularly advantageous in the case that the antenna 31 is a single common antenna, because identification of the wheels 6a to 6d (transceiver devices 2) is necessary.

In place of performing the wheel position detection after the predetermined time from the turning on of the ignition switch so that the tire air pressure can be checked before starting of travel, it may be performed at other times, for example, when a tire is changed. Tire change may be detected by a switch (not shown), which is operated for wheel position detection, or an inclination sensor, which detects inclination of the chassis 7 of the vehicle 1.

The first and second trigger devices 5a and 5b may be provided at the right side of the central line CL. The first and second trigger devices 5a and 5b may be provided near the left front wheel 6b and the right rear wheel 6c, respectively. The first and second trigger devices 5a and 5b may be provided near the right front wheel 6a and the left rear wheel 6d, respectively. The trigger device 5 may be only one.

The present invention is not limited to a vehicle of four wheels, but may be used in vehicles of different number of wheels including more than four wheels.

What is claimed is:

1. A detection system for a vehicle having tire wheels and a chassis, the system comprising:
    a plurality of transceiver devices, each of which is attached to a corresponding one of the wheels and includes a receiver, a first controller and a transmitter, the receiver being configured to receive a detection trigger signal, the first controller being configured to detect a signal magnitude of the detection trigger signal received by the receiver and store signal magnitude data indicative of detected signal magnitude in a frame, and the transmitter being configured to transmit the frame;
    a trigger device attached to the chassis at a position, which is different in distance from the wheels, and configured to transmit the detection trigger signal; and
    a receiver device attached to the chassis and including a receiver and a second controller, the receiver being configured to output a detection trigger command signal for transmission of the detection trigger signal by the trigger device and to receive the frame from the transceiver device, the second controller being configured to detect a wheel attached with the transceiver device based on the signal magnitude data included in the frame,
    wherein the receiver device is configured to cause the trigger device to transmit a notification trigger signal for notification of wheel position detection thereby to set the transceiver device in a signal reception wait condition before transmission of the detection trigger signal, and to cause the trigger device to transmit the detection trigger signal after reception of a set signal from the transceiver device indicating that the transceiver device is set in the signal reception wait condition, and
    wherein the transceiver device is configured to intermittently turn on power supply to a trigger detector of the receiver for a predetermined period for setting the trigger detector in the signal reception wait condition, to turn on the power supply to the first controller and the transmitter when the trigger detector detects the notification trigger signal in the signal reception wait condition, to set the trigger detector in the signal reception wait condition by extending the predetermined period and to transmit the set signal to the receiver device upon reception of the notification trigger signal by the trigger detector, and to turn on the power supply to the first controller and the transmitter for measuring the signal magnitude of the detection trigger signal when the detection trigger signal is received in the signal reception wait condition.

2. The detection system according to claim 1, wherein the transceiver device is configured to set the trigger detector in the signal reception wait condition for an extended period longer than the predetermined period when the trigger detector receives the notification trigger signal and to release the signal reception wait condition by automatically stopping the power supply to the trigger detector after an elapsed predetermined time when the detection trigger signal is not received in the extended period.

3. The detection system according to claim 1, wherein:
    the receiver device is configured to cause the trigger device to transmit the notification trigger signal as a repetition of frames, each of which includes synchronization information and data indicating a command to be executed by the transceiver; and
    the transceiver device is configured to include a data processor as a part of the receiver for executing the command indicated by the data of the notification trigger signal upon receiving the synchronization information, the data processor as well as the first controller and the transmitter being powered on by periodic power supply, the trigger detector maintaining the signal reception wait condition until reception of the data following the synchronization information is completed when the synchronization information is received in the signal reception wait condition.

4. The detection system according to claim 3, wherein the predetermined period of the signal reception wait condition is set longer than a sum of one frame of the synchronization information and the data and a period of the synchronization information.

5. The detection system according to claim 3, wherein the transceiver device is configured to check whether the synchronization information is for execution of a command and to power on the first controller and the transmitter by the power supply only when the synchronization information is for execution of a command.

6. The detection system according to claim 1, wherein a period of transmission of the notification trigger signal is set to be longer than the predetermined period of the power supply to the trigger detector.

7. The detection system according to claim 1, wherein:
the transceiver device further includes a sensor attached to each of the wheels to output a detection signal indicative of tire air pressure so that the detection signal is processed by the first controller and transmitted from the transmitter; and
the receiver device is configured to detect the tire air pressure by the second controller with respect to each wheel.

8. A detection method for a vehicle having tire wheels and a chassis, the method comprising:
transmitting a detection trigger signal from a trigger device attached to the chassis to a plurality of transceiver devices attached to the wheels;
measuring a signal magnitude of the detection trigger signal when received by the transceiver device, which is set in a signal wait condition for a predetermined period intermittently, so that a data indicating the measured signal magnitude is transmitted in return from the transceiver device;
receiving the data by a receiver device attached to the chassis to detect a position of the transceiver device in the vehicle;
transmitting a notification trigger signal from the trigger device in advance of transmitting the detection trigger signal;
setting, when the notification trigger signal is received in the predetermined period, the transceiver device in the signal wait condition to enable reception of the detection trigger signal; and
transmitting a data indicating reception of the notification trigger signal from the transceiver device so that the receiver device causes the trigger device to transmit the detection trigger signal.

* * * * *